3,218,129
SEPARATION OF HYDROGEN FLUORIDE AND SILICON TETRAFLUORIDE
James E. Barker, East Point, Joseph W. Markey, College Park, and William A. Satterwhite, East Point, Ga., assignors to Tennessee Corporation, New York, N.Y., a corporation of New York
Filed Jan. 22, 1963, Ser. No. 253,160
7 Claims. (Cl. 23—153)

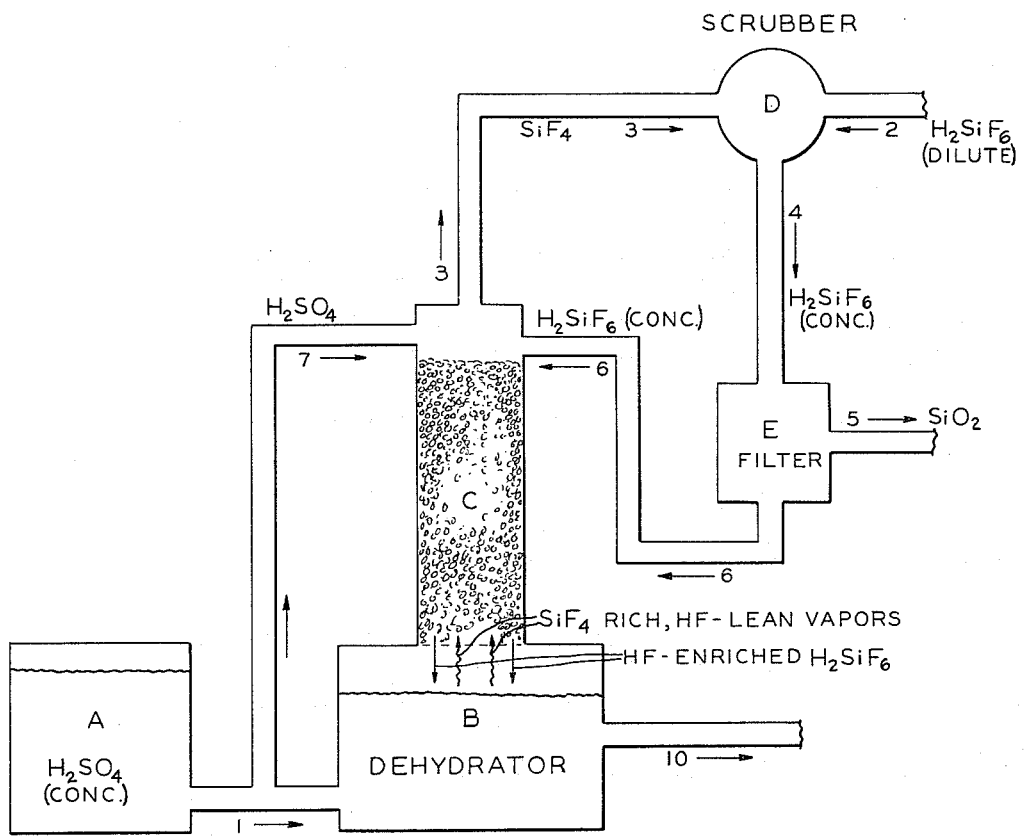

This invention relates to the treatment of dilute aqueous solutions of fluosilicic or hydrofluosilicic acid, and more particularly to the separation and recovery therefrom of hydrofluoric acid (HF) and silicon tetrafluoride ($SiF_4$).

It is well known that potentially valuable fluoric materials are evolved in various industrial operations, the most important of which are probably the manufacture of fertilizers, steel, and aluminum. For example, a large annual tonnage of fluorine-containing gases is evolved during the processing of phosphate rock in the production of superphosphate fertilizers and other phosphate chemicals. Depending on the nature of the operation and the materials used, fluorine is evolved in the form of $SiF_4$ or hydrofluosilicic acid. At the present time these potentially valuable chemicals are either lost to the atmosphere as HF and/or $SiF_4$, thereby creating a hazard to both plant and animal life, or in the course of efforts to reduce air pollution, they are scrubbed from the stacks with water to produce solutions of fluosilicic acid. Such solutions are not only weak (10–20%) but also contain a certain amount of phosphate along with silica and other impurities.

The principal objects of the invention are to provide a more effective and economical process for separating and recovering HF and $SiF_4$ in pure and concentrated forms from such by-product materials.

This invention is related to the prior co-pending applications of Llewellyn C. Oakley, Jr. et al., Serial No. 222,526, filed September 10, 1962 for The Process of Producing Hydrogen Fluoride As a Dry Gas From Clear Fluosilicic Acid-Containing Solutions; Theodore T. Houston et al., Serial No. 222,527, filed September 10, 1962, for The Process of Producing Hydrogen Fluoride From Fluosilicic Acid in a Two-Stage Procedure; Gerald E. G. Wilkinson, Serial No. 222,447, filed September 10, 1962, for The Process of Producing Hydrogen Fluoride in a Two-Stage Procedure and Effecting Evolution of the Hydrogen Fluoride in the Second Stage by the Conjoint Action of the Addition of Hot Concentrated Sulfuric Acid and the Application of Vacuum; Theodore T. Houston, Serial No. 222,443, filed September 10, 1962, for The Process of Producing Hydrogen Fluoride in a Two-Stage Procedure and Effecting a Rapid Evolution of the Hydrogen Fluoride by Sweeping the Second Stage With an Inert Gas; and Fred J. Klem, Serial No. 222,424, filed September 10, 1962, for The Process of Producing Hydrogen Fluoride in a Two-Stage Procedure and Effecting a Rapid Evolution and an Effective Recovery of the Hydrogen Fluoride by Sweeping the Second Stage with a Condensible Inert Gas. These five co-pending applications together with the present application are all owned by a common assignee.

When solutions of $H_2SiF_6$ of the kind mentioned are dehydrated with concentrated sulfuric acid, a vapor rich in $SiF_4$ and also containing HF results. The hot sulfuric acid absorbs HF preferentially to $SiF_4$, but nevertheless some HF vapor is swept out of the system with the nearly anhydrous $SiF_4$ vapor.

We have discovered, quite unexpectedly, that a more efficient operation is secured by flowing a concentrated solution of fluosilicic acid (30–50%) countercurrent to the effluent $SiF_4$-rich, HF-lean vapors through a suitable packed column. Substantially quantitative absorption of the HF vapors by the concentrated fluosilicic acid takes place, but at the same time the essentially anhydrous $SiF_4$ gas is allowed to escape from the top of the column and can be handled separately in any desired manner.

It is advantageous to integrate the foregoing improvement with sulfuric acid dehydration in a continuous process by flowing the HF-enriched liquor down the column to the dehydrator where eventually the HF fraction is absorbed by hot sulfuric acid, and by using the rich $SiF_4$ gas emerging from the top of the column to fortify a weaker fluosilicic acid. This fortified fluosilicic acid (30–50%) is filtered to remove silica and is then fed to the top of the column.

Thus one is able to produce anhydrous HF more efficiently by stripping this gas from the sulfuric acid. $SiF_4$ gas or concentrated fluosilicic acid can be produced separately or returned to the process as desired. Another valuable product resulting from this process is the silica formed in reabsorbing the $SiF_4$ gas in weak fluosilicic acid. At this point fluosilicic acids as strong as 47–50% can be produced by simply cooling the scrubbers to 100–130° F. This again is a very important advantage, for it is very impractical to produce a fluosilicic acid stronger than 32% (constant boiling mixture) by concentrating a weak acid by boiling.

A modification of the invention comprises the feeding of small amounts (2–12%) of concentrated sulfuric acid with the concentrated fluosilicic acid at the top of the column. While this use of sulfuric acid is not essential to succesful operation of the process, it has the advantage of lowering the boiling points of the solutions in the column, thereby permitting operation at a lower temperature and preventing deposition of silica.

The accompanying drawing is a diagram showing the operation of a system according to the invention.

Concentrated sulfuric acid (93–98%) from tank A is fed via pipe 1 to dehydrator B at a rate necessary to dehydrate the weak fluosilicic acid being fed at 2 to a scrubber D. Thus the sulfuric acid is diluted to 60–80%, while the fluosilicic acid is dehydrated to its anhydrous components—HF and $SiF_4$. Intermediately, the weak incoming fluosolicic acid is fortified with near anhydrous $SiF_4$ vapor entering the scrubber D via the line 3, external cooling being applied to produce a concentrated fluosilicic acid (30–50%) which leaves the scrubber at 4 and flows through a filter E. From the filter slica is removed at 5, while the clear fluosilicic acid is pumped at 6 to the top of a packed column C. A small amount (2–12%) of the concentrated sulfuric acid can be fed, if desired, via the pipe 7 to the top of the column to increase the efficiency. As the concentrated acids from 6 and 7 contact each other and the $SiF_4$-rich, HF-lean vapors rising from dehydrator B, as indicated by the arrows, the HF vapors are absorbed by the liquids and the $SiF_4$ vapors pass out the top of the column to the scrubber.

As the liquid runs countercurrent down the column, it becomes enriched with HF, and when it reaches the hot sulfuric acid (150–240° F.) in dehydrator B it is dehydrated with the preferential absorption of HF in the diluted $H_2SO_4$. The $SiF_4$ is liberated and is driven up the column again taking some HF vapor with it to repeat the process. A continuous flow of hot sulfuric acid containing 2–10% HF and the water from the incoming weak fluosilicic acid is removed at 10.

The temperatures in the column C are controlled by the temperature of the sulfuric acid in dehydrator B, the boiling points of the liquids in the column being the upper limits. The boiling points of 47% fluosilicic acid saturated with $SiF_4$ vary with the amount of concentrated sulfuric acid fed at the top of the column approximately as follows:

| H$_2$SO$_4$ Percent of total feed: | Boiling point, °F. |
|---|---|
| 0 | 185 |
| 2.5 | 155 |
| 5.0 | 143 |
| 11.5 | 118 |

Normally, it is preferred to operate the column by feeding 5 parts of 98% H$_2$SO$_4$ per 95 parts of 47% fluosilicic acid. Thus the column should run about 220° F. at the bottom and 143° F. at the top. The exiting SiF$_4$ under these conditions contains 96% SiF$_4$, 4% H$_2$O, and only traces of HF. The liquid flowing from the bottom of the column contains approximately 15% HF, 28% SiF$_4$, 5% H$_2$SO$_4$, and 52% H$_2$O. The mixture leaving the dehydrator will normally contain approximately 77% H$_2$SO$_4$ with about 3% absorbed HF. Other conditions can be used, however, and these cited are not intended to limit the scope of the invention.

Without using the present invention, a vapor containing approximately 80% SiF$_4$, 12% HF, and 8% H$_2$O would be driven off from the dehydration of fluosilicic acid with concentrated sulfuric acid. Therefore, our invention provides an important improvement in the recovery of HF per cycle.

It is to be understood that the invention is not restricted to the details of the foregoing description and that reference should be had to the appended claims for a definition of its limits.

What is claimed is:

1. In a process of the type in which fluosilicic acid is dehydrated with sulfuric acid and hydrogen fluoride is recovered from the sulfuric acid, the dehydration step producing an effluent mixture consisting essentially of vapors of silicon tetrafluoride and some hydrofluoric acid, the combination with said dehydration step of a method of separating said vapors which comprises contacting said effluent mixture with aqueous fluosilicic acid at 30–50% concentration and substantially saturated with silicon tetrafluoride, thereby selectively absorbing said hydrogen fluoride vapors in said aqueous acid and separating therefrom the unabsorbed silicon tetrafluoride vapors.

2. The process set forth in claim 1 in which said aqueous fluosilicic acid and absorbed hydrofluoric acid vapors are charged to said dehydration step.

3. The process set forth in claim 1, in which said silicon tetrafluoride vapors after separation of said hydrofluoric acid vapors therefrom are used to saturate dilute aqueous fluosilicic acid to said range of 30–50% concentration for use in said selective absorption step.

4. The process set forth in claim 3, in which said saturated fluosilicic acid is filtered to remove silica before being used in said selective absorption step.

5. The process set forth in claim 1 in which said effluent mixture from said dehydration step passes in counter-current contact with said fluosilicic acid moving to said dehydration step.

6. The process set forth in claim 5 in which 2–12% sulfuric acid is added to fluosilicic acid moving to said dehydration step in counter-current contact with said effluent mixture.

7. The process set forth in claim 6 in which the temperature adjacent the inlet of said fluosilicic acid to the counter-current absorption zone is maintained at about 118°–230° F., and the unabsorbed silicon tetrafluoride vapors from said zone are brought into contact with dilute aqueous fluosilicic acid at a temperature in the range of 100° F. to 220° F. to fortify said acid to a concentration in said range of 30–50% for use in the counter-current absorption zone.

References Cited by the Examiner

UNITED STATES PATENTS

| 1,297,464 | 3/1919 | Hechenbleikner | 23—153 |
| 1,938,533 | 12/1933 | Penfield | 23—153 |
| 2,296,118 | 9/1942 | Preisman | 23—153 |
| 2,833,628 | 5/1958 | Molstad | 23—205 |
| 3,024,086 | 3/1962 | Cines | 23—153 X |

MAURICE A. BRINDISI, *Primary Examiner.*